United States Patent
Assaad et al.

(10) Patent No.: US 11,938,807 B2
(45) Date of Patent: Mar. 26, 2024

(54) DEVICE FOR COOLING AND LUBRICATING AN ELECTRIC POWER TRAIN OF AN ELECTRIC OR HYBRID MOTOR VEHICLE

(71) Applicants: RENAULT s.a.s., Boulogne-Billancourt (FR); NISSAN MOTOR CO., LTD., Yokohama-Shi (JP)

(72) Inventors: Bassel Assaad, Saint Cyr l'École (FR); Julien Borie, Guyancourt (FR)

(73) Assignees: RENAULT s.a.s., Boulogne-Billancourt (FR); NISSAN MOTOR CO., LTD., Yokohama (JP)

( * ) Notice: Subject to any disclaimer, the term of this patent is extended or adjusted under 35 U.S.C. 154(b) by 259 days.

(21) Appl. No.: 17/602,573

(22) PCT Filed: Mar. 20, 2020

(86) PCT No.: PCT/EP2020/057861
§ 371 (c)(1),
(2) Date: Oct. 8, 2021

(87) PCT Pub. No.: WO2020/207770
PCT Pub. Date: Oct. 15, 2020

(65) Prior Publication Data
US 2022/0126677 A1    Apr. 28, 2022

(30) Foreign Application Priority Data
Apr. 11, 2019 (FR) .................................. 19 03881

(51) Int. Cl.
*B60K 11/02* (2006.01)
*B60K 1/00* (2006.01)
*H02K 9/19* (2006.01)

(52) U.S. Cl.
CPC ............... *B60K 11/02* (2013.01); *B60K 1/00* (2013.01); *B60K 2001/006* (2013.01); *B60Y 2200/91* (2013.01); *B60Y 2306/05* (2013.01)

(58) Field of Classification Search
CPC .... B60K 1/00; B60K 11/02; B60K 2001/006; B60K 2001/003; B60Y 2410/10;
(Continued)

(56) References Cited

U.S. PATENT DOCUMENTS 4,393,824 A * 7/1983 Fischer .................... B60H 1/22
                                                    123/196 R
6,945,207 B2 * 9/2005 Biess ...................... F02D 25/04
                                                    123/142.5 R
(Continued)

FOREIGN PATENT DOCUMENTS

DE    10 2011 076 525 A1    11/2012
EP          3363103 A1    8/2018
(Continued)

OTHER PUBLICATIONS

International Search Report dated Jul. 14, 2020 in PCT/EP2020/057861 filed Mar. 20, 2020, 2 pages.

*Primary Examiner* — Alex W Mok
(74) *Attorney, Agent, or Firm* — Oblon, McClelland, Maier & Neustadt, L.L.P.

(57) ABSTRACT

A device cools a power train of a vehicle including an electric machine with a wound rotor coupled to a speed reducer. The device includes: an oil cooling circuit for cooling the electric machine, the circuit include a heat exchanger connected to an oil tank and a water circuit that connects members of the power train through the radiator of the vehicle; a temperature adjuster of the oil flow supplied at the outlet of the exchanger to a distribution circuit projecting the oil to elements for heating the electric machine; a circuit for lubricating the reducer, the circuit (Continued)

including a sump, the bottom of the sump forming a reserve of oil for lubricating the reducer; and a bypass channel at the outlet of the exchanger, for conveying a portion of the temperature-adjusted oil in contact with the bottom of the sump in order to cool the oil reserve.

10 Claims, 2 Drawing Sheets

(58) Field of Classification Search
CPC ............ B60Y 2306/05; B60Y 2306/03; B60Y 2200/91; H02K 9/19
USPC .......................................................... 310/54
See application file for complete search history.

(56) References Cited

U.S. PATENT DOCUMENTS

| | | | | |
|---|---|---|---|---|
| 8,912,691 | B2* | 12/2014 | Miyamoto | .............. F16K 15/00 |
| | | | | 137/511 |
| 9,846,002 | B2* | 12/2017 | Berry | ...................... F28D 15/00 |
| 2018/0294693 | A1 | 10/2018 | Yu | |
| 2018/0334025 | A1* | 11/2018 | Hashimoto | .............. B60K 1/02 |

FOREIGN PATENT DOCUMENTS

| | | |
|---|---|---|
| FR | 3 030 383 A1 | 6/2016 |
| JP | 2020198675 A * | 12/2020 |
| WO | WO 2015/181459 A1 | 12/2015 |
| WO | WO 2017/064390 A1 | 4/2017 |

\* cited by examiner

DEVICE FOR COOLING AND LUBRICATING AN ELECTRIC POWER TRAIN OF AN ELECTRIC OR HYBRID MOTOR VEHICLE

The invention relates to a device for cooling and lubricating an electric power train, of the type comprising an electric machine with a wound rotor and a speed reducer which is coupled to the electric machine.

With the increase of the power density of electric machines which are intended for applications of electric or hybrid motor vehicles, the improvement of the efficiency of cooling of these machines has become a critical issue. Amongst the known solutions, cooling by means of direct injection of oil onto the heating elements of the machine is particularly advantageous.

The patent document WO2018/206890 discloses an oil cooling circuit of an electrical machine with a wound rotor, which ensures the cooling of the rotor, the stator and the joints and bearings of the electric motor. It also ensures the lubrication of the joints and bearings. This circuit comprises a heat exchanger which is connected, on the one hand, to a pipe for removing cooling liquid, for example, from a water circuit which passes via a water/air exchange radiator of the vehicle and, on the other hand, to a pipe for removing oil from an oil reservoir which is arranged in the lower portion of the electric machine, and control means which enable the supply at the outlet of the exchanger of a flow of oil which is controlled in terms of temperature to an oil distribution circuit of the cooling circuit which is intended to project oil which is controlled in terms of temperature from the heat exchanger onto the heating elements of the electric machine, whilst the oil which is projected in this manner is recovered in the oil reservoir by means of gravitational force.

In particular, the means which enable the temperature of the oil which is distributed at the outlet of the exchanger to be controlled comprise a thermostatic valve which is activated by means of a wax capsule which is placed on the oil cooling circuit of the motor in order to short-circuit the heat exchanger associated with this motor when the temperature of the oil circulating in the cooling circuit is lower than a temperature threshold. This short-circuit of the heat exchanger enables in particular the temperature increase of the oil to be accelerated when the electric motor is started up at a low temperature. In contrast, when the temperature of the oil is greater than the temperature threshold, the valve allows the oil to pass only toward the heat exchanger, which will cool the oil which leaves the reservoir before it is returned after cooling to the distribution circuit upstream of the heating elements of the motor. Also, when the temperature of the oil is above this threshold, a portion of the flow of oil at the output of the heat exchanger may be diverted directly into the oil reservoir which is arranged below the machine, without passing via the heating elements of the machine, in order to promote the cooling of the oil in the region of the high-temperature exchanger.

However, the principle of integrating a valve with a wax thermostat in the oil circuit in order to enable the exchanger to be short-circuited during operation at low temperature and to return the oil directly to the oil reservoir without passing via the heating elements of the machine during hot operation has a given number of disadvantages. Firstly, this arrangement brings about risks in terms of reliability concerning the operation of the wax thermostat, which may be linked, on the one hand, to the compatibility of the wax capsule with the oil used in the cooling circuit and, on the other hand, to the range of operating temperatures imposed to control the wax thermostat. Furthermore, the integration of the wax thermostat in the oil circuit requires the use of a pressure sensor in order to carry out diagnostics of the thermostat, in particular in order to ensure that the pressure difference between the oil in the valve and in the oil circuit is not likely to prevent the movement of the wax capsule. If the wax thermostat becomes blocked, there is a safety risk concerning the machine.

Furthermore, from the cooling systems of electric power trains which comprise an electric machine with a wound rotor associated with a speed reducer, it is known in particular via the example given in the patent document EP3363103 to use the lubrication oil of the speed reducer coupled at the output of the electric machine for a direct cooling of the heating elements of the electric machine. In this manner, this document describes an electric machine and a speed reducer which are cooled by the same oil flowing in a circuit which shares the cooling oil of the machine and the lubrication oil of the speed reducer. The use of the lubrication oil of the speed reducer for cooling the heating elements of the machine enables the temperature of the oil to be increased rapidly at low speed and enables friction losses to be reduced. When the same oil is used for the speed reducer and the electric machine, however, the pollution of the oil by pollutants of the speed reducer, typically fine metal particles which become detached from the gear mechanisms of the speed reducer risks affecting the electrical insulation of the motor with a wound coil, as a result of abrasive contacts which are produced between these metal particles carried by the common oil and the copper wires of the coils of the electric motor.

Furthermore, in the context of the development of such electric power trains for an application on the rear axle of an electric or hybrid vehicle, the cooling of the lubrication oil of the speed reducer is problematic. This is because the oil circulating in the cooling circuit of the electric machine may be cooled, as in the example given by document WO2018/206890 mentioned above, by an oil/water heat exchanger which is arranged in the oil cooling circuit of the machine and which is associated with a water circuit and a water/air exchange radiator of the vehicle. In contrast, regarding the heat generated in the speed reducer, if there is a requirement for the heat to be discharged via an air flow, in the context of the application to the rear axle of the vehicle, this flow of air below the rear hood of the vehicle may be found to be insufficient to ensure the desired heat exchange.

Therefore, an object of the invention is to provide a device for cooling and lubricating an electric power train of an electric or hybrid motor vehicle, comprising an electric machine with a wound rotor and a speed reducer which is coupled to the machine, which is at least partially free of the limitations set out above.

To this end, the invention relates to a device for cooling and lubricating an electric power train of an electric or hybrid motor vehicle, comprising an electric machine with a wound rotor and a speed reducer which is coupled to the machine, the device comprising: a cooling circuit of the electric machine which is supplied with oil, comprising a heat exchanger which is connected, on the one hand, to a pipe for removing cooling liquid coming from a cooling liquid circuit which connects members of the electric power train passing via the radiator of the vehicle and, on the other hand, to a pipe for removing oil coming from an oil reservoir which is arranged in the lower portion of the electric machine and control means in order to supply at the output of the heat exchanger a flow of oil which is controlled in terms of temperature to an oil distribution circuit of the cooling circuit which is capable of projecting the oil which is controlled in terms of temperature and which is from the heat exchanger onto heating elements of the electric machine, whilst the oil projected in this manner is recovered in the oil reservoir, the device also comprising:

a lubrication circuit of the speed reducer comprising a housing inside which the speed reducer is arranged, the base of the housing being shaped to constitute an oil store which enables the speed reducer to be lubricated by moving a volume of oil generated by the rotation of the elements of the speed reducer in contact with the oil store, the device being characterized in that it comprises at the output of the heat exchanger a diversion pipe which is capable of conveying a portion of the oil which is controlled in terms of temperature and which is from the heat exchanger to the inlet of a network of heat exchange pipes which are arranged in contact with the base of the housing of the speed reducer in order to enable the oil of the oil store to be cooled, the output of the network of heat exchange pipes being connected to the oil reservoir.

In this manner, the controlled cooling oil coming from the heat exchanger of the cooling circuit of the electric machine is used to remove heat produced by the speed reducer as a result of the network of oil/oil heat exchange pipes, ensuring a heat exchange between, on the one hand, the lubrication oil contained in the speed reducer and, on the other hand, the cooling oil of the electric machine, without any need to share the oil between the machine and the speed reducer, or to install another specific exchanger as a water/oil exchanger which is dedicated to the speed reducer. In other words, the oil/liquid cooling heat exchanger, supplemented by the cooling liquid circuit, typically a water circuit, and the water/air exchange radiator of the vehicle, may be shared between the electric machine and the speed reducer in order to remove the heat generated in the machine and the speed reducer.

According to an embodiment, the heat exchange pipes are formed in the housing of the speed reducer. In other words, it is a system integrated in the speed reducer.

According to another embodiment, the heat exchange pipes are external with respect to the housing of the speed reducer.

Advantageously, the cooling circuit comprises an oil pump which is capable of drawing in oil from the oil reservoir, the oil pump being connected to the oil removal pipe.

Advantageously, the control means comprise a valve which is arranged in the cooling liquid circuit upstream of the cooling liquid removal pipe which is connected to the heat exchanger, the valve being connected, on the one hand, to the removal pipe and, on the other hand, to a diversion branch which is tapped from the cooling liquid circuit in order to short-circuit the heat exchanger, the valve being capable of enabling at least a portion of the cooling liquid flowing in the cooling liquid circuit to be diverted into the diversion branch in accordance with the ambient temperature.

Advantageously, the valve is arranged in the cooling liquid circuit between a power inverter of the electric power train and the heat exchanger.

Advantageously, the valve may be a thermostatic valve which is activated by a wax capsule or a solenoid valve.

Advantageously, the oil distribution circuit of the cooling circuit comprises oil inlet channels which are capable of conveying the oil with respect to joints and bearing which are arranged at one side and the other of the rotor of the electric machine, and flexible nozzles which are fixed to these oil inlet channels and which are intended to control the flow of oil which is discharged from these channels to the joints and bearings.

Advantageously, the oil distribution circuit of the cooling circuit comprises oil inlet channels which are capable of conveying the oil with respect to a periphery of the stator, the channels opening in two opposing nozzles which are located at the periphery of the stator, in a distal manner relative to a longitudinal center axis of the stator.

The invention also relates to an electric or hybrid motor vehicle which comprises an electric power train which comprises an electric machine with a wound rotor and a speed reducer which is coupled to the machine, and a device for cooling and lubricating the power train as described above.

Other features and advantages of the invention will be appreciated from the following description which is given by way of non-limiting example with reference to the appended drawings, in which.

Figure 1:
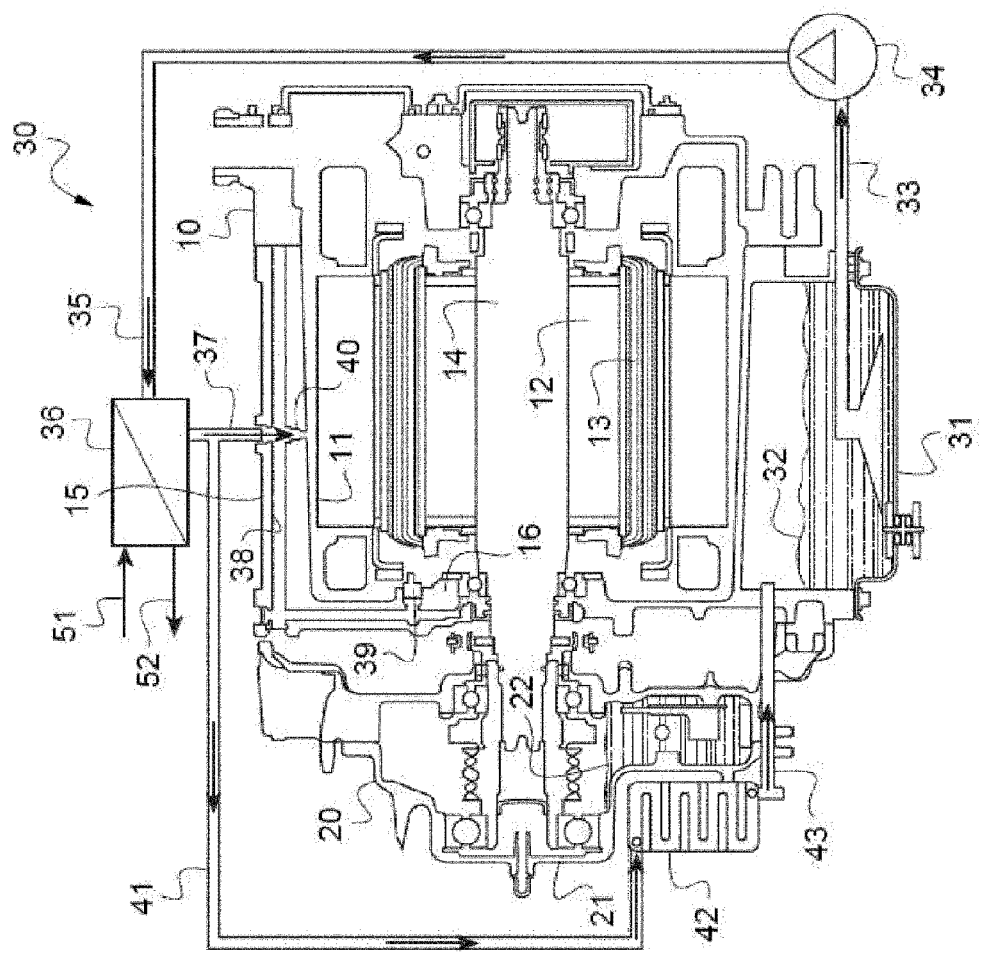
FIG. 1 is a schematic illustration of the cooling and lubricating device of an electric power train according to one embodiment of the invention.

According to the embodiment illustrated in FIG. 1, the cooling and lubricating device according to the invention is provided in order to cool an electric machine 10 to which there is connected a mechanical speed reducer 20 of an electric power train of an electric or hybrid motor vehicle which is intended to be applied to the rear axle of the vehicle.

The electric machine 10 is composed in particular of a stator 11 which is provided with a cylinder head and a rotor 12 which is constituted by protruding magnetic poles, around which copper coils 13 are wound. The rotor 12 is mounted on a shaft 14 which is fixed, on the one hand, to the rotor and, on the other hand, to a housing 15 of the electric machine via bearings and joints 16.

The mechanical speed reducer 20 is integrated in a speed reducer housing 21 and is coupled at the outlet of the rotor shaft 14. The speed reducer is constituted by an assembly of gears which are intended to vary the rotation speed and the torque of the electric machine. A lubrication oil store 22 is contained inside the speed reducer housing 21 in the region of the base of the housing and is intended to enable the elements of the speed reducer to be lubricated and cooled by means of bubbling through the assembly, in other words as a result of the movement of a volume of oil generated by the rotation of the elements of the speed reducer which are in contact with the oil store.

Furthermore, the device of the invention comprises an oil cooling circuit 30 of the electric machine 10 which is intended to cool the heating elements of the machine which are the rotor 12 and the stator 11, and to cool and lubricate the elements which are the bearings and joints 16 on which the rotor shaft is mounted by projecting oil on these elements. To this end, the cooling circuit 30 comprises an oil reservoir 31 which is arranged in the lower portion of the housing of the electric machine therebelow, and which is intended to store a reserve of cooling oil 32 of the electric machine. An oil outlet pipe 33 opens outside the reservoir 31 and is connected to an oil pump 34, which enables the cooling oil stored in the reservoir 31 to be drawn in. The oil pump 34 is connected at the output thereof to an oil removal pipe 35 which conveys the oil removed by the pump 34 into a heat exchanger 36 which is intended to cool the oil received from the removal pipe 35 before reinjecting it toward an oil distribution circuit which enables the oil which is cooled at the heat exchanger 36 to be conveyed and projected directly onto the heating elements of the electric machine. The oil projected in this manner recovers the heat produced by the machine and then returns to the reservoir 31 by means of gravitational force.

The oil distribution circuit of the cooling circuit of the machine comprises an inlet toward the stator 37 from which oil inlet channels 38 which are capable of conveying the cooled oil with respect to the housings of the joints and bearing 16 which are arranged at one side and the other of the rotor 12 of the electric machine are distributed. These channels are preferably provided with flexible nozzles which are fixed to these oil inlet channels in order to enable the flow of oil which is discharged from these channels toward the housings of joints and bearings 16 to be controlled. These oil inlet channels 38 are also configured to convey the cooled oil toward injectors 39 which are located at one side and the other of the rotor 12 opposite the coil heads of the rotor.

Furthermore, the inlet 37 toward the stator of the oil distribution circuit is capable of conveying the oil with respect to a periphery of the stator. Preferably, it is connected to channels 40 which open in two opposing nozzles which are located at the periphery of the stator, in a distal manner relative to a longitudinal center axis of the stator. Thus, as a result of these two nozzles which are positioned in this manner, in contrast to an arrangement in which the oil would be projected substantially at the center of the stator, only a portion of the oil projected will come into contact with the surfaces of the cylinder head of the stator, whilst another portion will flow directly toward the reservoir. This advantageously enables the heating of the oil projected in this manner to be limited, which is important for the durability thereof. Furthermore, the oil which is projected by the two opposing nozzles and which flows toward the reservoir without coming into contact with the surfaces of the cylinder head of the stator is cooled oil coming from the heat exchanger 36 so that, by mixing with the warmer oil contained in the reservoir, it will contribute to reducing the overall temperature of the cooling oil stored in the reservoir.

Figure 2:
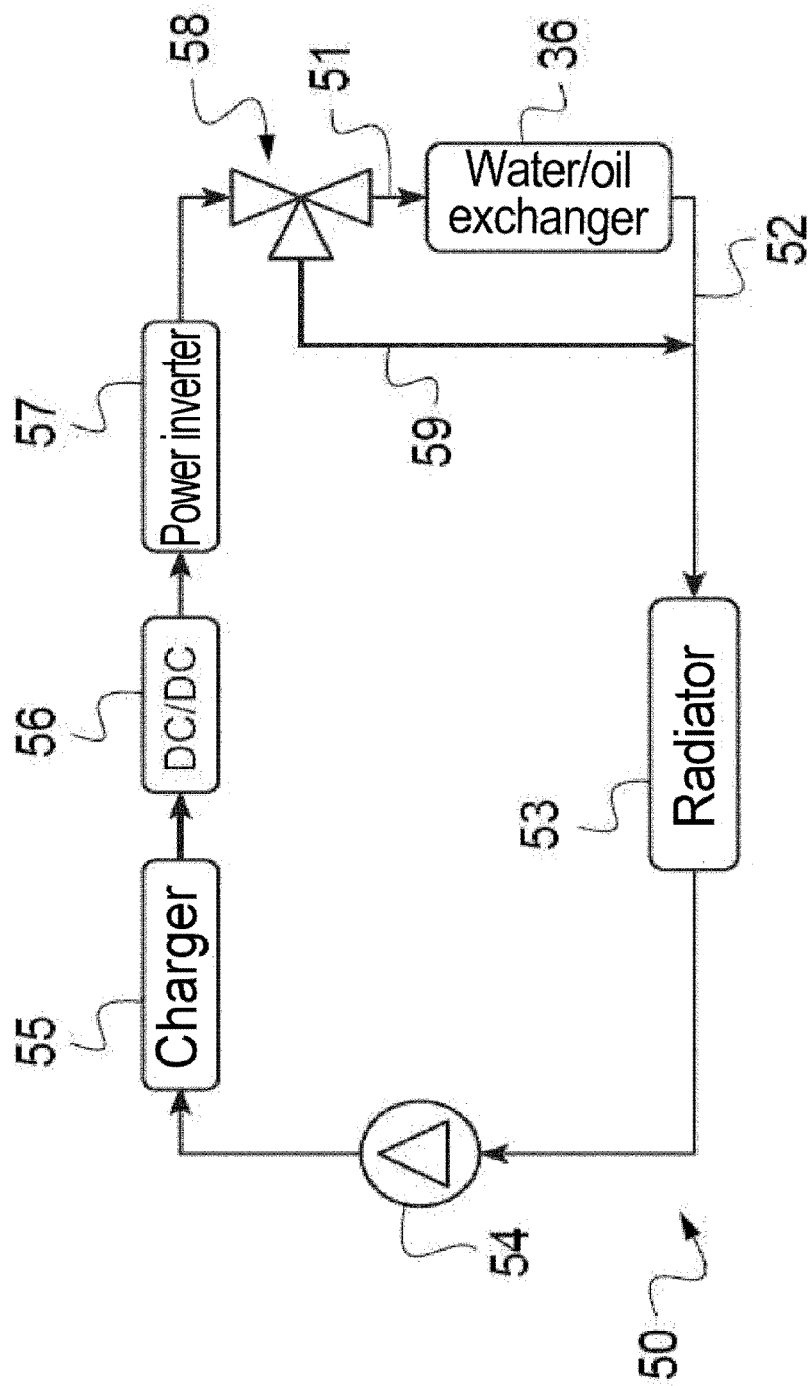
FIG. 2 is a schematic illustration of the cooling liquid circuit which passes via the radiator of the vehicle and which is coupled to the heat exchanger of the cooling circuit of the device of FIG. 1.

In order to cool the oil from the pump 34 via the oil removal pipe 35, the heat exchanger 36 is connected to a cooling liquid removal pipe 51, for example, of the type with a mixture of water with an antifreeze, coming from a cooling liquid circuit which connects members of the electric drive train to the heat exchanger 36. With reference to FIG. 2, the heat exchanger 36 which is intended to cool the cooling oil is therefore a water/oil exchanger which is fixed in the region of the electric drive train and which is shared with the other members of the electric drive train via a water circuit 50 which passes via the water/air exchange radiator 53 of the vehicle. The water outlet 52 of the water/oil exchanger 36 provides water at a warmer temperature than in the region of the pipe 51 which constitutes the water inlet of the oil/water exchanger 36, then the water will have removed heat from the oil via the heat exchanger 36. The water which is heated in this manner and which comes from the water outlet 52 of the heat exchanger 36 is conveyed toward the water/air exchange radiator 53 of the vehicle to be cooled, then is supplied via the water circuit 50 to a water pump 54 which is connected at the outlet thereof to the water inlet 51 of the heat exchanger 36 via other members of the electric drive train of the vehicle, which are the units of the charger 55, DC/DC converter 56 and power inverter 57, for supplying electric power to the electric machine. In this manner, the water pump 54 ensures the circulation between the various elements and the radiator 53 ensures the cooling of the water by air.

As explained above, the cooling oil of the machine is used to lubricate the joints and bearings of the machine. Now, at low temperature, in particular for temperatures within a range from −30° C. to +5° C., the oil used is very viscous, which is unfavorable for the lubrication function desired. Without this lubrication, the joint and bearing components of the machine will be defective from the first rolling movements, hence the need to send a small quantity of oil onto these components.

Furthermore, at low temperature, in the region of the water/oil exchanger 36 of the cooling circuit of the machine, the water flowing in the water circuit which is cooled by the radiator and the cold environment of the vehicle will contribute to keeping the oil passing through the exchanger 36 at low temperature. The oil projected onto the heating elements of the machine being kept at a low temperature results in the presence of thermal shocks, in particular with the surface of the coils of the rotor, which become heated during operation. Such thermal shocks are detrimental to the durability of the coil and may result in the electric machine being prematurely taken out of service. Also, the great viscosity of the oil at low temperature is unfavorable for the operation of the electric machine as a result of the increase of the resultant friction losses.

Furthermore, during operation of the machine at high temperature, in particular for temperatures greater than 5° C., the cooling of the machine with a hot oil involves other problems. In this manner, in order to ensure an efficient water/oil heat exchange in the region of the exchanger of the cooling circuit and therefore in order to ensure adequate discharge of the thermal losses of the machine, it is necessary to specify a quite significant oil flow rate at the heat exchanger. Now, the increase of the oil flow rate from a specific operating speed will generate friction losses in the machine, as a result of the oil, particularly since it may be trapped in the air gap.

In order to overcome these problems, therefore, it is necessary to be able to control the temperature of the oil conveyed upstream of the electric machine in order to cool and lubricate the electric machine, taking into account the temperature and operating conditions of the machine.

These control means advantageously comprise a control valve 58 which is integrated in the water circuit 50 which is coupled to the water/oil exchanger 36 of the cooling circuit of the electric machine. The valve 58 is integrated in this water circuit 50 between the power inverter unit 57 and the water/oil exchanger 36. This valve 58 is arranged immediately upstream of the water inlet 51 of the water/oil exchanger 36 and is connected, on the one hand, to this water inlet 51 and, on the other hand, to a diversion branch 59 which is tapped from the water circuit in order to short-circuit the water/oil exchanger 36. It is therefore a three-way valve which enables the circulation or the passage of the water to be controlled between the water pipe of the water circuit where it is branched and one or other of the two pipes from the water inlet 51 of the water/oil exchanger 36 and the diversion branch 59 which short-circuits the water/oil exchanger 36. In this manner, the valve 58 is capable of enabling at least a portion of the water arriving in the water/oil exchanger 36 to be diverted into the diversion branch 59, in accordance with the ambient temperature. The function of this valve 58 is therefore to control the flow of water which passes via the water/oil exchanger 36, in accordance with the temperature and therefore to control in terms of temperature the flow rate of oil which passes via the water/oil exchanger. The valve 58 is, for example, a solenoid valve which is controlled by an electronic control unit or is a thermostatic valve which comprises, for example, a thermostat which is activated by a wax capsule which enables the passage into the corresponding channel to be blocked or opened.

In this manner, in an operating mode of the electric machine at low temperature, the temperature of the water being lower than a temperature threshold, the valve 58 is capable of allowing water to pass only in the diversion branch 59 which short-circuits the water/oil exchanger 36, the water thus being conveyed directly to the inlet of the air/water radiator 53 or, in a variant, allowing a low flow rate of water to be sent to the water/oil exchanger. In this manner, the valve 58 enables the circulation of water between the water circuit 50 and the water/oil exchanger 36 to be prevented or, in a variant, enables only a very low flow rate of water toward the exchanger when the water temperature is less than the predetermined temperature threshold corresponding to an operating condition of the machine at low temperature. In this manner, during the temperature increase phase, as long as the temperature is below this threshold, the cooling oil of the electric machine conveyed upstream of the heating elements of the electric machine is not cooled by the water/oil exchanger, or very little depending on the variant, which ensures rapid heating of the oil under these operating conditions at low temperature. The control of the valve 58 in this operating mode therefore enables the water/oil exchanger to be short-circuited during a temperature increase phase by controlling the circulation of the water only in the diversion branch 59.

As a result of this arrangement, overheating of the oil pump 34 linked with the viscosity of the oil at low temperature is advantageously avoided. The durability of the pump is thereby improved without it being necessary to proceed with an oversizing thereof. Furthermore, as a result of the rapid heating of the oil at low temperature, thermal shocks between the oil and the surfaces of the coils of the machine onto which the oil is projected are prevented. The friction losses are also thereby significantly reduced.

It should be noted that the cooling constraints of the other components of the water circuit (charger/DC-DC converter/power inverter) do not enable control of the flow rate of water entering the water/oil exchanger to be envisaged via the control of the water pump of the circuit. The addition of the valve 58 to the water circuit is therefore particularly advantageous in this regard.

In an operating mode of the hot electric machine, corresponding to an operating mode in which the temperature of the water is greater than the predetermined temperature threshold, the valve 58 is, in this mode, capable of allowing the water arriving to pass toward the water/oil exchanger 36 only in the region of the water inlet 51 of the exchanger 36. In other words, the water/oil exchanger 36 is not short-circuited in this mode and the water/oil exchanger 36 thus cools the cooling oil of the machine coming from the oil pump which will be distributed to the heating elements of the machine. In order to improve the efficiency of the cooling of the oil in the region of the water/oil exchanger, the water pump 54 may be controlled in order to provide an additional flow of water which will pass via the water/oil exchanger 36, the cooling at the exchanger is therefore improved without requiring the oil flow rate to be increased at the exchanger, which would otherwise increase the friction losses.

The valve 58 is therefore placed on the water circuit of the electric power train in order to short-circuit the water/oil exchanger 36 of the cooling circuit of the electric machine when the temperature of the water leaving the water circuit is less than the predetermined temperature threshold and, otherwise, to pass all the water via the water/oil exchanger in order to cool the cooling oil which comes from the machine before returning it to the machine after cooling.

As explained above, at the output of the exchanger 36, the cooling oil which is controlled in terms of temperature and which comes from the exchanger 36 is supplied to the oil distribution circuit 37-40 which enables the oil supplied by the heat exchanger 36 to be conveyed and projected onto the heating elements of the electric machine.

In accordance with the invention, the cooling and lubricating device also comprises a diversion pipe 41 whose inlet is tapped at the output of the heat exchanger 36 in order to convey a portion of the controlled oil coming from the heat exchanger 36 to the inlet of a network 42 of heat exchange pipes which are arranged in contact with the base of the housing 21 of the speed reducer 20 in order to enable the oil from the lubrication oil store of the speed reducer to be cooled. This is because, during operation, the speed reducer 20 generates heat which it is necessary to discharge in order to ensure good lubrication of the mechanical components of the speed reducer and to prevent the lubrication oil of the speed reducer from overheating. In this manner, the oil which is controlled in terms of temperature and which comes from the heat exchanger 36 flowing though the network 42 of heat exchange pipes in contact with the base of the housing of the speed reducer 20 will enable the heat of the oil contained at the base of the housing of the speed reducer to be removed, which itself enables the discharge of the thermal losses of the speed reducer to be ensured. In other words, the network 42 of heat exchange pipes in which the oil from the heat exchanger 36 is conveyed in order to carry out the desired heat exchange with the oil contained in the speed reducer constitutes an oil/oil exchanger for cooling the oil contained in the speed reducer. Consequently, the outlet of the oil/oil exchanger 42 is connected to the cooling oil reservoir 31 arranged below the electric machine, via an outlet pipe 43 which conveys the oil to the reservoir 31.

The diversion pipe 41 for conveying the cooling oil of the machine from the outlet of the exchanger 36 to the oil/oil exchanger with the lubrication oil of the speed reducer may be an external pipe or an internal pipe with respect to the housing of the speed reducer. Also, the heat exchange pipes which are arranged in contact with the base of the housing of the speed reducer in order to form the oil/oil exchanger are either formed in the speed reducer housing or external.

The invention claimed is:

1. A device for cooling and lubricating an electric power train of an electric or hybrid motor vehicle, comprising an electric machine with a wound rotor and a speed reducer coupled to the machine, the device comprising:
   a cooling circuit of the electric machine which is supplied with oil, comprising a heat exchanger which is connected to a pipe for removing cooling liquid coming from a cooling liquid circuit which connects members of the electric power train passing via a radiator of the vehicle and to a pipe for removing oil coming from an oil reservoir which is arranged in the lower portion of the electric machine and control means in order to supply at an output of the heat exchanger a flow of oil which is controlled in terms of temperature to an oil distribution circuit of the cooling circuit which is configured to project the oil which is controlled in terms of temperature and which is from the heat exchanger onto heating elements of the electric machine, whilst the oil projected in this manner is recovered in the oil reservoir;

a lubrication circuit of the speed reducer comprising a housing inside which the speed reducer is arranged, a base of the housing being shaped to constitute an oil store which enables the speed reducer to be lubricated by moving a volume of oil generated by the rotation of elements of the speed reducer in contact with the oil store; and a diversion pipe at the output of the heat exchanger, the diversion pipe being configured to convey a portion of the oil which is controlled in terms of temperature and which is from the heat exchanger to an inlet of a network of heat exchange pipes which are arranged in contact with the base of the housing of the speed reducer in order to enable the oil of the oil store to be cooled, the output of the network of heat exchange pipes being connected to the oil reservoir.

2. The device as claimed in claim 1, wherein the heat exchange pipes are formed in the housing of the speed reducer.

3. The device as claimed in claim 1, wherein the heat exchange pipes are external with respect to the housing of the speed reducer.

4. The device as claimed in claim 1, wherein the cooling circuit comprises an oil pump which is configured to draw in oil from the oil reservoir, the oil pump being connected to the oil removal pipe.

5. The device as claimed in claim 1, wherein the control means comprise a valve which is arranged in the cooling liquid circuit upstream of the cooling liquid removal pipe which is connected to the heat exchanger, the valve being connected to the removal pipe and to a diversion branch which is tapped from the cooling liquid circuit in order to short-circuit the heat exchanger, the valve being configured to enable at least a portion of the cooling liquid flowing in the cooling liquid circuit to be diverted into the diversion branch in accordance with the ambient temperature.

6. The device as claimed in claim 5, wherein the valve is arranged in the cooling liquid circuit between a power inverter of the electric power train and the heat exchanger.

7. The device as claimed in claim 5, wherein the valve is a thermostatic valve which is activated by a wax capsule or a solenoid valve.

8. The device as claimed in claim 1, wherein the oil distribution circuit of the cooling circuit comprises oil inlet channels which are configured to convey the oil with respect to joints and bearing which are arranged at one side and the other of the rotor of the electric machine, and flexible nozzles which are fixed to these oil inlet channels and which are intended to control the flow of oil which is discharged from these channels to the joints and bearings.

9. The device as claimed in claim 1, wherein the oil distribution circuit of the cooling circuit comprises oil inlet channels which are configured to convey the oil with respect to a periphery of a stator, the channels opening in two opposing nozzles which are located at the periphery of the stator, in a distal manner relative to a longitudinal center axis of the stator.

10. An electric or hybrid motor vehicle, comprising:

an electric power train which comprises an electric machine with a wound rotor and a speed reducer which is coupled to the machine, and the device as claimed in claim 1.

* * * * *